United States Patent [19]

Baumhauer, Jr. et al.

[11] Patent Number: 5,226,076
[45] Date of Patent: Jul. 6, 1993

[54] DIRECTIONAL MICROPHONE ASSEMBLY

[75] Inventors: John C. Baumhauer, Jr., Indianapolis; Jeffrey P. McAteer, Fishers; Frederick A. Rosebrock, Greenfield, all of Ind.; Richard M. Sachs, Middletown, N.J.

[73] Assignee: AT&T Bell Laboratories, Murray Hill, N.J.

[21] Appl. No.: 486,444

[22] Filed: Feb. 28, 1993

[51] Int. Cl.$^5$ ............................................. H04M 1/04
[52] U.S. Cl. ..................................... 379/388; 379/419; 379/420; 379/432; 381/155
[58] Field of Search ............... 379/388, 420, 387, 419, 379/433, 432; 381/83, 93, 111, 92, 155

[56] References Cited

U.S. PATENT DOCUMENTS

| | | | |
|---|---|---|---|
| 3,715,500 | 2/1973 | Sessler et al. | 179/1 DM |
| 3,830,988 | 8/1974 | Mol et al. | 379/419 |
| 4,009,355 | 2/1977 | Poradowski | 179/121 D |
| 4,528,426 | 7/1985 | Fatovic et al. | 179/121 D |
| 4,675,906 | 6/1987 | Sessler et al. | 381/92 |
| 4,742,548 | 5/1988 | Sessler et al. | 381/92 |
| 4,773,091 | 9/1988 | Busche et al. | 379/433 |
| 4,850,016 | 7/1989 | Groves et al. | 379/433 |
| 4,862,507 | 8/1989 | Woodard | 381/155 |
| 4,885,773 | 12/1989 | Stottlemyer et al. | 379/420 |
| 4,937,877 | 6/1990 | Pocock et al. | 379/420 X |

OTHER PUBLICATIONS

Application Ser. No. 455,128 filed Dec. 22, 1989.
Knowles Electronics, Inc.-Technical Bulletin TB-21 "EB Directional Hearing Aid Microphone Application Notes".

Primary Examiner—James L. Dwyer
Assistant Examiner—M. Shehata
Attorney, Agent, or Firm—Michael A. Morra

[57] ABSTRACT

A directional microphone assembly is constructed from a first-order-gradient microphone element enclosed within a housing, molded from an acoustically-opaque, resilient material such as Ethylene-Propylene-Diene-Monomer. The microphone element includes a diaphragm which moves under the influence of sound pressures applied on its opposite surfaces to generate an electrical signal which is proportional to the differential sound pressure. The housing includes a first acoustically-transparent channel for communicating sound pressure from a first opening in the housing to one surface of the diaphragm, and a second acoustically-transparent channel for communicating sound pressure from a second opening in the housing to the other surface of the diaphragm. The housing supports the microphone element and forms a continuous seal around its perimeter so that sound pressure in one channel does not leak into the other. The distance between the openings is relatively large in order to improve the sensitivity and directivity of the microphone. Moreover, the directional microphone assembly is configured to be embedded within, or behind, an exterior surface of sound-input equipment with the openings of the housing located along the exterior surface. The resilient housing structure forms a seal with the sound-input equipment surface.

13 Claims, 4 Drawing Sheets

| CHARACTERISTIC | OMNIDIRECTIONAL | CARDIOID | SUPERCARDIOID | HYPERCARDIOID | BIDIRECTIONAL |
|---|---|---|---|---|---|
| POLAR RESPONSE PATTERN | (circle with θ) | (cardioid) | (supercardioid) | (hypercardioid) | (figure-eight) |
| $B$ | 0 | 1 | $\sqrt{3}$ | 3 | $\infty$ |
| POLAR DIRECTIVITY $D(\theta) = \dfrac{1 + B\cos\theta}{1 + B}$ | 1 | $\dfrac{1 + \cos\theta}{2}$ | $\dfrac{1 + \sqrt{3}\cos\theta}{1 + \sqrt{3}}$ | $\dfrac{1 + 3\cos\theta}{4}$ | $\cos\theta$ |
| BEAM WIDTH 3dB DOWN | 360° | 131° | 115° | 105° | 90° |
| BEAM WIDTH 6dB DOWN | 360° | 180° | 156° | 141° | 120° |
| FRONT-TO-BACK RESPONSE RATIO | 1.00 0dB | ∞ | 3.73 11.4dB | 2.00 6.0dB | 1.00 0dB |
| RANDOM ENERGY EFFICIENCY | 1.000 0dB | 0.333 -4.8dB | 0.268 -5.7dB | 0.250 -6.0dB | 0.333 -4.8dB |
| DISTANCE FACTOR | 1 | 1.73 | 1.93 | 2.00 | 1.73 |
| NULL | — | 180° | ±125° | ±110° | ±90° |

PRIOR ART
FIG. 5

DIRECTIONAL MICROPHONE ASSEMBLY

CROSS-REFERENCE TO RELATED APPLICATION

This application is related to the application of J. C. Baumhauer, Jr. et al., entitled "Loudspeaking Telephone Station Including Directional Microphone," Ser. No. 455,128, filed Dec. 22, 1989.

TECHNICAL FIELD

This invention relates to directional microphones and more particularly to a structure for holding one or more microphone elements.

BACKGROUND OF THE INVENTION

Microphones having a directional characteristic are useful in many applications. One known technique for achieving directionality is through the use of a first-order-gradient (FOG) microphone element which comprises a movable diaphragm with front and back surfaces enclosed within a capsule. The capsule includes openings on each side thereof for admitting sound pressure to interact with the front and back surfaces of the diaphragm. In response to this interaction, an electrical signal is generated that is proportional to the differential sound pressure on the opposite surfaces of the diaphragm. Sounds are ignored that come from directions in which the wave front arrives at the front and back surfaces of the diaphragm at the same time. In this situation the instantaneous sound pressure on each surface of the diaphragm is identical, so the differential sound pressure is zero. Sounds emanating from other directions reach one surface of the diaphragm before the other according to the delay encountered in traveling an effective path length "d" between the opposite surfaces. This delay creates directionality, but it also affects the frequency response characteristic because path length "d" corresponds to a different fraction of a wavelength at each different frequency. Low frequency response is poor because sound waves having practically the same phase arrive on opposite surfaces of the diaphragm at the same time.

U.S. Pat. No. 3,715,500 was issued to Sessler et al. on Feb. 6, 1973 and is entitled Unidirectional Microphones. Sessler et al. disclose the use of tubes in connection with a FOG microphone element to effectively increase the separation between its sound ports. While increased separation improves the low frequency response of the microphone, the disclosed construction is somewhat cumbersome to assemble and install in modern sound-input equipment.

U.S. Pat. No. 4,742,548 was issued to Sessler et al. on May 3, 1988 and is entitled Unidirectional Second Order Gradient Microphone. In this patent, sensitivity is improved by housing a FOG microphone within a baffle so as to increase the effective acoustic path length between sound ports of the FOG microphone. The baffle comprises a flat surface which is preferably square or circular. While this structure represents an advance with respect to the prior art, it does not address the problem of conveniently fitting the FOG microphone into sound-input equipment due to its large physical size and projection above the sound-input equipment surface.

One known microphone device, designated WM-46AAD201, is available from National/Panasonic and provides a cardioid polar response characteristic. A FOG microphone element is enclosed within a rigid, 2-piece plastic housing which includes openings that permit sound waves to enter the housing on each side of the FOG microphone. The housing and the FOG microphone are mutually held together by glue or other bonding material so that each side of the FOG microphone is exclusively influenced by sound waves entering the appropriate opening in the housing. Unfortunately, the construction of such a device is labor intensive due to the use of bonding materials—an extra step that requires curing time. Moreover, if applied improperly, leaks may result, thus changing the acoustic directional characteristic.

One directional microphone assembly of merit which uses tubes to couple a microphone element to the desired sound pickup points is shown at FIG. 2 of the Knowles Electronics, Inc. Technical Bulletin TB-21, "EB Directional Hearing Aid Microphone Application Notes." Unfortunately, no structural means is provided for supporting such an assembly within sound-input equipment, and the tubes do not appear easily sealed against the equipment surface.

Therefore, it is desirable to provide a housing for a microphone element which is of relatively simple construction so that manufacture and installation are facilitated.

Additionally, it is desirable that the microphone assembly retain the functional improvement achieved by Sessler et al. while being unobtrusive in nature and easily installed into sound-input equipment.

SUMMARY OF THE INVENTION

A directional microphone assembly is constructed from a microphone element enclosed within a housing made from an acoustically-opaque, resilient material. The microphone element includes a diaphragm which moves under the influence of sound pressure applied to its opposite surfaces to generate an electrical signal which is proportional to the differential sound pressure. The housing includes a first acoustically-transparent channel for communicating sound pressure from a first opening in the housing to one surface of the diaphragm, and a second acoustically-transparent channel for communicating sound pressure from a second opening in the housing to the other surface of the diaphragm.

In an illustrative embodiment of the invention, the housing is molded from Ethylene-Propylene-Diene-Monomer which is rubber-like material that is resilient. It forms an excellent seal around the perimeter of the microphone element so that sound pressure in one channel does not leak into the other. Moreover, the rubber-like material forms a seal with the surface of sound-input equipment where it is housed.

In the illustrative embodiment, the housing is formed from two identical pieces that are joined in the region of the microphone element. In this embodiment, the use of bonding materials is not necessary because the microphone element engages each of the identical housing pieces with sufficient friction to hold the entire structure together.

It is a feature of the present invention that the directional microphone assembly may be conveniently embedded within or mounted behind an exterior surface of sound-input equipment with the channel openings deployed on one or more of its surfaces.

Other features and advantages of the present invention will be more fully understood when reference is made to the detailed description and the drawing.

BRIEF DESCRIPTION OF THE DRAWING

FIG. 5 illustrates, in table form, characteristics associated with the microphone of FIG. 3 for different values of B;

DETAILED DESCRIPTION

GENERAL

Pressure Microphones

Figure 1:
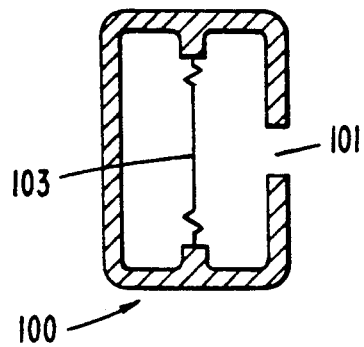
FIG. 1 discloses a pressure microphone element having an omnidirectional polar response characteristic.

Single port microphones are capable of sensing instantaneous sound pressure at their input sound port and producing an electrical output voltage signal corresponding to the magnitude of the sound pressure. Such microphones are known as "pressure microphones" and are generally constructed as shown in FIG. 1. Sound port 101 admits sound into microphone 100 which interacts with one side of diaphragm 103 to produce an electrical voltage. The other side of diaphragm 103 resides in a closed region whose volume affects the compliance of the diaphragm. Pressure microphones are equally responsive to sounds coming from any direction and, therefore, their response patterns are omnidirectional. FIG. 5 discloses the farfield omnidirectional response pattern of the pressure microphone along with other selected characteristics associated with it. The information in FIG. 5 was compiled using data in the Knowles Electronics, Inc. Technical Bulletin, TB-21; "EB Directional Hearing Aid Microphone Application Notes."

First-Order-Gradient Microphones

Figure 2:
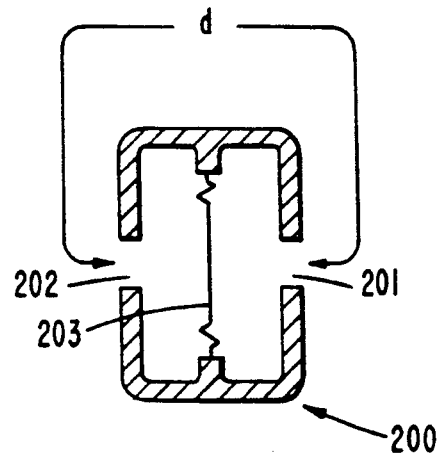
FIG. 2 discloses a first-order-gradient microphone element such as used in the present invention.

Gradient microphones are those which achieve a directional polar response characteristic by measuring the differential pressure on opposite sides of one or more diaphragms. FIG. 2 discloses a first-order-gradient (FOG) microphone 200 having input sound ports 201, 202 positioned on opposite sides of diaphragm 203. The sound ports are separated by an effective distance "d" which represents the distance that a sound wave must travel around the FOG in going from one sound port 201 to the other 202. Movements of diaphragm 203 are converted into voltages at the output of the microphone. The magnitude of the voltage output of the FOG microphone is a function of the instantaneous difference in sound pressure on the opposite sides of diaphragm 203. As distance "d" becomes smaller and smaller, so too does the output voltage from the FOG. Recall that the velocity of sound in air at 70 degrees Fahrenheit is 1128 feet per second, so that a $f=2250$ Hz audible signal has a wavelength of about six inches. Thus, even small separation distances provide sufficient phase difference between the sound ports 201, 202 so that the FOG microphone has a bidirectional polar response pattern such as shown in FIG. 5. In fact, the polar response pattern is largely independent of frequency as will be seen in equation (2). Note that the polarity of the output voltage is determined by the particular side of the diaphragm that is first impinged upon by the moving wavefront. Note also that the FOG microphone is unresponsive to sounds coming from certain directions that are known as nulls. This property is of use in the present invention. A FOG microphone element, suitable for use in connection with the present invention, is the WM-55A103 manufactured by the Panasonic division of Matsushita Electric Corp.

The spatial separation "d" between the sound ports leading to opposite sides of the diaphragm 203 may be varied. The pressure gradient $\Delta p$, in the far-field, has the following relationship to "d".

$$\Delta p \propto \sin(\tfrac{1}{2}kd \cos \theta) \quad (1)$$

where:

$$k = \frac{2\pi f}{c};$$

$\theta$ = polar orientation of the impinging wavefront with respect to the major axis of the microphone; and c = wave velocity.

Equation (1) may be simplified for small values of kd to become:

$$\Delta p \propto \tfrac{1}{2}kd \cos \theta \quad (2).$$

Figure 3:
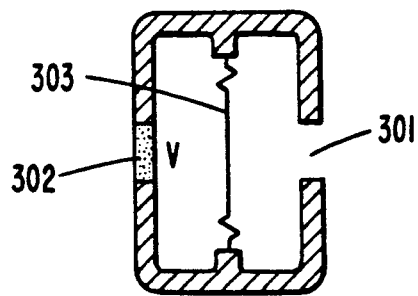
FIG. 3 discloses a first-order-gradient microphone element having a restriction in one of its sound ports.
Figure 4:
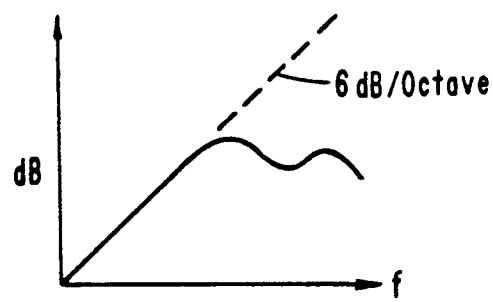
FIG. 4 illustrates the frequency response of the microphone shown in FIG. 2.

The sensitivity or frequency response of a FOG microphone [equation (1)], for the direction $\theta=0°$, is shown in FIG. 4. It is known that the frequency response and the directivity pattern may be changed by altering the gradient microphone itself. For example, acoustic resistance $R_a$ may be introduced into one of the sound ports 302 (see FIG. 3) leading to diaphragm 303 of the FOG microphone. Such resistance alters both the directivity pattern and the frequency response.

More generally, the directivity pattern $D(\theta)$ associated with FOG microphones operating in the far field, and where $kd<1$ is given by the following relationship:

$$D(\theta) = \left[\frac{1 + B\cos\theta}{1 + B}\right] \quad (3)$$

-continued where: $B = \dfrac{d/c}{R_a C_a}$; and $C_a = \dfrac{V}{\rho c^2}$

In equation (3), $\rho$ is the density of air, V is the volume of the acoustic region behind the diaphragm, and $C_a$ is the acoustic compliance (similar to capacitance) between diaphragm and $R_a$. From equation (3), a cardioid response is achieved when B is set equal to 1, which is to say that the time constant $R_a C_a$ is set equal to the time it takes for a sound wave to travel distance "d." FIG. 5 illustrates such a cardioid pattern as well as other characteristics of this particular FOG microphone. Another popular shape is known as a supercardioid. It is obtained when d, $R_a$ and V are adjusted such that B is set equal to the square root of 3. Further, by increasing the value of B to 3, a hypercardioid directivity pattern is created. Each of the selected microphone configurations, shown in FIG. 5, has its own set of characteristics such as: (i) the location (in degrees) of its null; (ii) distance factor—a multiplier indicating how many times more than the distance from a pressure microphone to the sound source that a directional microphone can be and have the same signal-to-random incident noise ratio: (iii) front-to-back response ratio etc.

Figure 6:
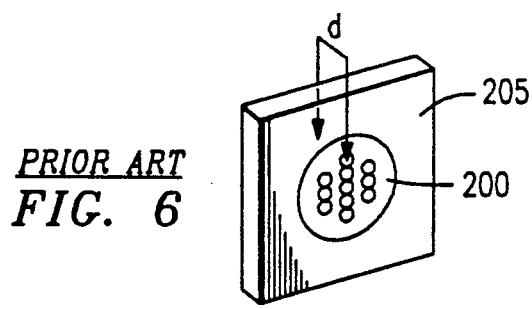
FIG. 6 discloses a prior art first-order-gradient microphone that achieves improved sensitivity through the use of a baffle.

Referring now to FIG. 6, there is disclosed a prior art configuration which is discussed at length in U.S. Pat. No. 4,742,548. Baffle 205 surrounds FOG microphone 200 and provides an increase in the distance that the wavefront of an acoustic signal must travel in going from one side of the FOG microphone to the other. This distance "d" is a parameter that directly affects the sensitivity of the associated microphone as well as its frequency, and sometimes affects the polar response characteristics. Unfortunately, this baffle must be oriented perpendicular to the sound-input equipment surface and its shape must be accommodate in the design of said equipment—thus limiting design flexibility.

Figure 7:
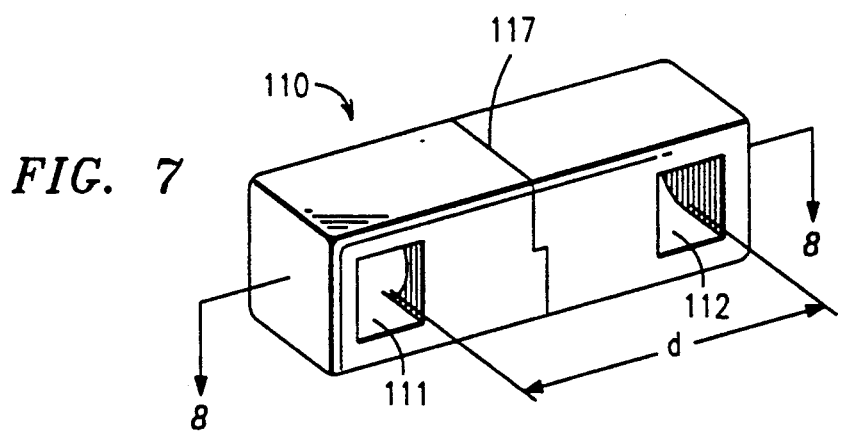
FIG. 7 discloses a perspective view of a housing for a first-order-gradient microphone element in accordance with the invention.
Figure 8:
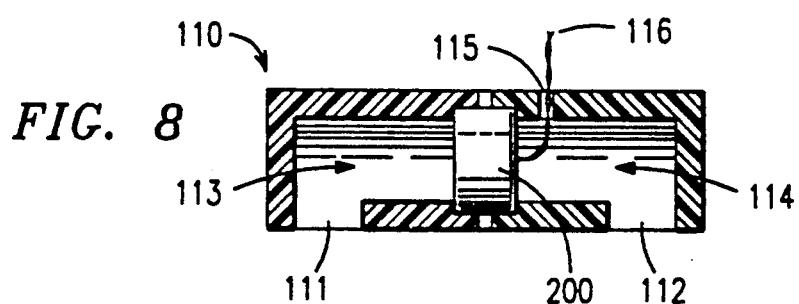
FIG. 8 shows a cross-section of the housing of FIG. 7.

FIG. 7 discloses a low profile housing 110 for a FOG microphone element that effectively extends the distance "d" between sound ports of the FOG microphone element contained therein. This rectangular block structure is molded from vulcanized (cured) rubber or other suitable resilient material and replaces baffle 205 as shown in FIG. 6. One suitable material that is commercially available is Ethylene-Propylene-Diene-Monomer (EPDM). The housing is made from an acoustically opaque material which does not transmit sound pressure as efficiently as air. However, housing 110 includes openings 111, 112 which admit sound pressure, via acoustically transparent channels 113-114, into the cavity where the microphone element 200 (see FIG. 8) resides. Microphone element 200 includes a pair of wires 116 that exit the housing through a self-sealing hole 115. Housing 110 is sized to form a seal with the microphone element 200 so that the sound pressure in one of the channels is not leaked to the other channel around the microphone element. Advantageously, by using a resilient material for the housing, the need for adhesives to achieve sealing is eliminated. FIG. 8 is a cross-section view of the microphone/housing assembly, illustrating the interrelationship of housing 110, FOG microphone 200, channels 113, 114 and openings 111, 112.

Figure 9:
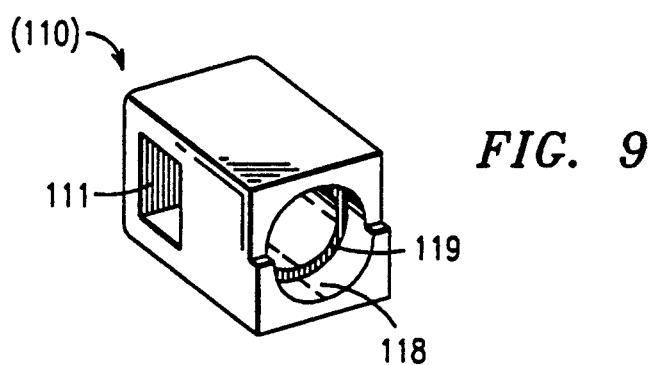
FIG. 9 discloses one piece of the FIG. 7 housing, the other piece being identical therewith, illustrating construction of the housing using two identical pieces.

FIG. 9 discloses one part of housing 110 illustrating that it can be manufactured from two identical parts. The junction 117 between these two parts is shown in FIG. 7. When the part of the housing shown in FIG. 9 is joined with an identical part, a cavity is formed in the region of surfaces 118, 119 which, illustratively, is cylindrical and sized to form a seal with the particular microphone element used. Because EPDM is a resilient material the use of bonding materials is not necessary because the microphone element engages each of the identical housing parts with sufficient friction to hold the resulting assembly together.

APPLICATIONS

Figure 10:
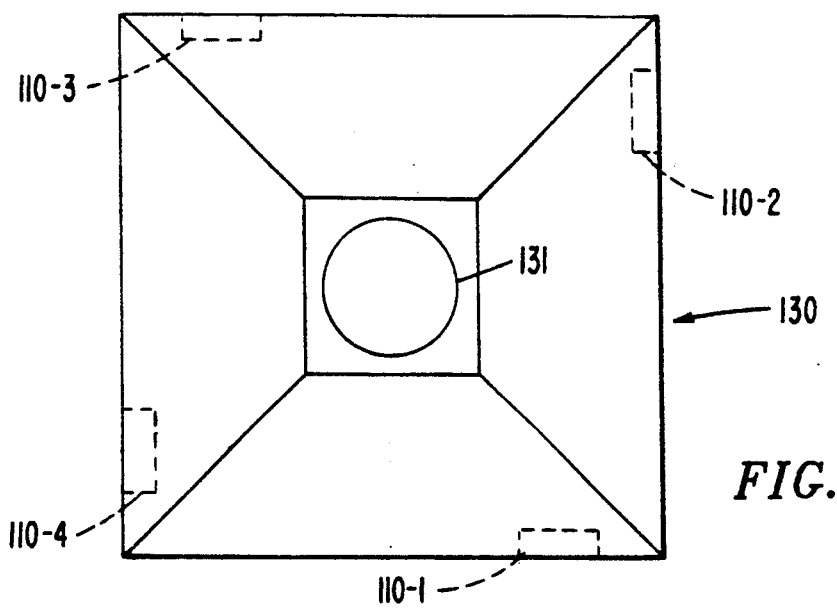
FIG. 10 discloses a top view of a teleconferencing unit including four first-order-gradient microphone elements enclosed in housings according to the invention.
Figure 11:
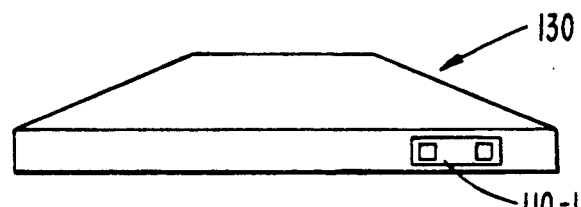
FIG. 11 discloses of front view of the teleconferencing unit shown in FIG. 10.

The present invention may be installed in any sound-input equipment that uses a directional microphone. Sound-input equipment such as a tape recorder or a telephone handset are representative examples. FIG. 10 discloses one application of the present invention within a teleconferencing unit. Teleconferencing unit 130 includes a loudspeaker 131 and four directional microphone assemblies (110-1,-2,-3,-4) positioned around the perimeter of a rectangular structure. Each microphone element is contained within a housing such as disclosed in FIG. 7. This array of microphones provides full room coverage which is most useful in a conference telephone application. Since, normally, only one person is speaking at a time, background noise and reverberation are minimized by activating only one microphone at a time. Circuits within the teleconferencing unit 130 compare the output signals from each of the directional microphone assemblies to determine which one is delivering the strongest signal. A front view of teleconferencing unit 130 is shown in FIG. 11 to illustrate the positioning of a representative one of the microphone housings 110-1, and to demonstrate that such units can be attractively packaged in a low-profile product. Four pockets are molded into the exterior surface of teleconferencing unit 130 in order to receive housings 110-1,-2,-3,-4. Each pocket is designed to be slightly smaller than the associated housing so that it will be frictionally held in place; this takes advantage of the resilient property of housing 110 which is also used in sealing the microphone element. The directional microphone is configured to be embedded within or mounted behind the surface of the teleconferencing unit 130 with the channel openings disposed on the exterior surface. In this manner, an inconspicuous device is deployed. Moreover, the rubber-like housing 110 forms a seal with the surface of the teleconferencing unit.

Figure 12:
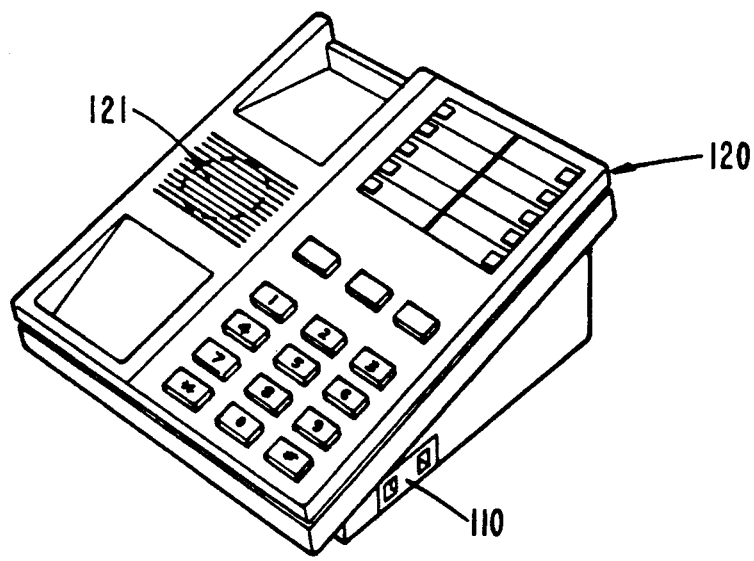
FIG. 12 discloses a perspective view of a loudspeaking telephone including a first-order-gradient microphone element enclosed in a housing according to the invention.

FIG. 12 discloses another application of the present invention. Here, microphone housing 110 is positioned along one side of a telephone station 120. This telephone station includes a loudspeaker 121 which enables hands-free operation and is also known as a speakerphone. Housing 110 contains a first-order-gradient microphone element such as shown in FIG. 2. The distance between the openings in housing 110 is chosen to improve sensitivity and to narrow the microphone beam width, thus creating a supercardioid polar response pattern. A pocket is molded into an exterior surface of the telephone station in order to receive housing 110. The pocket is slightly smaller than the housing so that the housing will be frictionally held therein. An acoustically transparent material may be used to conceal the openings in housing 110.

Although a particular embodiment of the present invention has been shown, it is clear that modifications are possible within the scope of the invention. Such modifications include, but are not limited to, the use of resilient materials other than EPDM for fabricating the housing, the use of housings that are not molded, and openings in the housing that are non-circular or that do not reside in the same plane. Further, rather than using a single FOG microphone element, the use of two electrically-interconnected, pressure microphone elements is contemplated within the spirit of the invention.

We claim:

1. A directional microphone assembly comprising a microphone element enclosed within a resilient housing, the microphone element including a diaphragm responsive to differential sound pressure on opposite sides thereof for generating an electrical signal proportional to the differential sound pressure, the resilient housing including: (i) a first acoustic waveguide, having only one input port, for guiding sound waves that effectively emanate from a point source at its input port to one side of the diaphragm; and (ii) an identically shaped second acoustic waveguide, having only one input port, for guiding sound waves that effectively emanate from a point source at its input port to the other side of the diaphragm, said housing being formed from an acoustically opaque material; whereby the first and second acoustic waveguides function to increase the path distance between opposite sides of the microphone element and thus improve microphone sensitivity and directivity.

2. The directional microphone assembly of claim 1 wherein the resilient housing supports the microphone element and forms a continuous seal around the outside perimeter of the microphone element so that the sound pressure in one acoustic waveguide is not communicated to the other.

3. The directional microphone assembly of claim 2 wherein the resilient housing is formed from a pair of identical structures that are joined together in the region where the microphone element is supported, each structure including one acoustic waveguide and one opening molded therein.

4. The directional microphone assembly of claim 2 wherein the resilient housing comprises Ethylene-Propylene-Diene-Monomer.

5. The directional microphone assembly of claim 2 combined with sound-input equipment having an exterior surface, the directional microphone assembly being embedded within or positioned directly behind said exterior surface of the sound-input equipment and forming a seal therewith; whereby sound-input equipment having a low profile appearance with improved microphone sensitivity and directivity is formed.

6. The combination of claim 5 wherein the sound-input equipment comprises a telephone station.

7. The combination of claim 5 wherein the sound-input equipment comprises a teleconferencing unit 8. A microphone assembly including an electroacoustic transducer having a diaphragm which moves in response to sound pressures being applied to opposite surfaces thereof, said electroacoustic transducer being housed in a rigid capsule having acoustic openings which admit sound pressure to each of diaphragm's surfaces, the capsule being supported on its perimeter by an acoustically opaque, resilient material that forms a seal with the capsule, the resilient material including identically shaped first and second acoustic waveguides molded therein, each having only one input port, for guiding sound waves that effectively emanate from first and second point sources, respectively located at the input ports of the acoustic waveguides, and for exclusively communicating same to the opposite surfaces of the diaphragm; whereby the effective spacing between said acoustic openings is increased.

9. In combination:
a first-order-gradient microphone including a diaphragm having first and second surfaces that cooperate to move the diaphragm in response to differential sound pressure between said first and second surfaces, and to generate an electrical signal in response to movements of the diaphragm; and
resilient means for housing the first-order-gradient microphone and forming a seal around an outside surface thereof, said resilient means being acoustically opaque and including identically shaped first and second acoustic waveguides therein, each having only one input port, for respectively guiding sound pressure variations that effectively emanate from first and second point sources located at the input port of an opening to its respective acoustic waveguide, and for exclusively communicating same onto the first and second surfaces of the diaphragm through an acoustically transparent medium.

10. The combination of claim 9 further including telephone apparatus having loudspeaker mounted therein for enabling hands-free operation, and at least one pocket along an exterior surface thereof for receiving the resilient means.

11. The combination of claim 10 wherein the pocket is sized to be slightly smaller than the resilient means; whereby the resilient means is frictionally held within the cavity without the use of bonding materials.

12. A housing for supporting a microphone element within a cavity located therein, said housing being made from resilient, acoustically opaque material, the housing further including:
a first acoustic waveguide, having only one input port, for guiding sound pressure variations effectively emanating substantially from a point source at the input port of the first acoustic waveguide, through an acoustically transparent medium, and for exclusively communicating same into the cavity of the housing; and
a second acoustic waveguide, identical in shape to the first acoustic waveguide and having only one input port, for guiding sound pressure variations, effectively emanating from a point source at the input port of the second acoustic waveguide, through an acoustically transparent medium, and for exclusively communicating same into the cavity of the housing 13. Loudspeaking telephone apparatus comprising a loudspeaker for converting electrical signals into audible sounds, and at least one microphone for converting audible sounds into electrical signals, the microphone comprising a first-order-gradient microphone element having acoustic openings on opposite sides of a single diaphragm, the microphone element being enclosed within a low profile housing made from a resilient, acoustically opaque material, the housing having a first acoustic waveguide molded therein, having only one input port, for guiding sound pressure variations, effectively emanating from a point source at the input port of the first acoustic waveguide, and for exclusively communicating same to one side of the diaphragm, and a second acoustic waveguide molded therein, identical in shape to the first acoustic waveguide and having only one input port, for guiding sound pressure variations, effectively emanating from a point source at the input port of the second acoustic waveguide, and for exclusively communicating same to the other side of the diaphragm.

* * * * *